United States Patent [19]

Krantz

[11] 4,190,069
[45] Feb. 26, 1980

[54] PROCESS FOR TRANSMITTING A HYDROCARBON FLUID THROUGH A PIPELINE

[75] Inventor: Karl W. Krantz, Schenectady, N.Y.

[73] Assignee: General Electric Company, Waterford, N.Y.

[21] Appl. No.: 584,417

[22] Filed: Jun. 6, 1975

[51] Int. Cl.$^2$ ............................ F17D 1/17; B01F 3/20
[52] U.S. Cl. ..................................... 137/13; 252/363.5; 260/31.6; 260/33.2 R; 260/33.4 PQ; 260/33.6 A; 260/33.6 SB; 260/33.6 PQ
[58] Field of Search ................ 252/8.3, 8.55 R, 363.5; 137/13

[56] References Cited

U.S. PATENT DOCUMENTS

| | | | |
|---|---|---|---|
| 3,215,154 | 11/1965 | White et al. | 137/13 |
| 3,559,664 | 2/1971 | Seymour | 137/13 |
| 3,654,994 | 4/1972 | Slagel et al. | 252/8.55 X |
| 3,687,148 | 8/1972 | Kruka et al. | 137/13 |
| 3,692,676 | 9/1972 | Culter et al. | 252/8.55 |

Primary Examiner—Herbert B. Guynn
Attorney, Agent, or Firm—Morgan, Finnegan, Pine, Foley & Lee

[57] ABSTRACT

Many liquids have properties improved, and fluid flow friction losses are reduced in flowing fluids by adding thereto a small, effective amount of composition comprising (i) a continuous phase of a liquid which is normally miscible with said fluid, and, dispersed therein, (ii) a stable discontinuous phase predominantly comprising fine particles of a high molecular weight polymer which is ultimately miscible with said fluid. In preferred features the compositions include a surface active agent. In other preferred features, friction is reduced in flowing hydrocarbons.

6 Claims, No Drawings

PROCESS FOR TRANSMITTING A HYDROCARBON FLUID THROUGH A PIPELINE

The present invention relates to compositions and methods for improving properties of liquid media and particularly for reducing friction losses in flowing hydrocarbon fluids. It also concerns a method for producing such compositions by in situ polymerization.

BACKGROUND OF THE INVENTION

Linear polymers of high molecular weight, including polydiorganosiloxanes as well as various organic polymers are known as effective agents for improving the flow, spreadability, wear resistance and other characteristics of liquid media, such as polishes, cosmetics, and the like. Also known is their ability to increase the flow of crude oils and refined petroleum products through pipelines. See, for example, Canevari et al, U.S. Pat. No. 3,493,000; Martellock, U.S. Ser. No. 72,193, filed on Sept. 14, 1970, now abandoned and assigned to the assignee of the present application; White et al, U.S. Pat. No. 3,215,154; Gibson, U.S. Pat. No. 3,351,079; Seymour et al, U.S. Pat. No. 3,559,664; British Pat. No. 1,319,098; Culter et al, U.S. Pat. No. 3,692,676; and Kruka et al, U.S. Pat. No. 3,687,148.

It is well known that such high polymers as drag reduction additives must be in solution in the liquid media, e.g., a flowing liquid hydrocarbon, e.g., crude or refined oil, in order to be effective. However, the practical attainment in the liquid media of homogeneous solutions of suitable concentration, typically 10–2000 ppm of polymer, has heretofore presented serious engineering and economic problems. Polymers of the required high molecular weight are hard gums, slow to dissolve, and direct injection of bulk polymer is completely impractical.

To date in laboratory and field tests, with pipeline fluids, it has proven convenient to inject previously prepared "master batch" solutions in hexane, kerosene, and the like. However, at levels of full scale use, which approach millions of pounds of additive annually, serious problems arise in the production, shipment and storage of such solutions.

One basic problem is the very high viscosity of master batch solutions, because of the necessarily high molecular weight of the drag-reducing polymer. Above a concentration limit of about 5 percent, the viscosity becomes so high that such solutions become impractical for injection pumping, and also very difficult to produce at uniform and controlled concentration. The cost of purchase and shipment of such large amounts of solvent in relation to active polymer is a serious burden.

A second basic problem is that the process of dissolving the hard gums ordinarily employed is inherently lengthy and expensive. Agitative intensity must be kept low to avoid shear degradation of the dissolved polymer to shorter chains, because these are ineffective as drag reducers. This requires costly investment in very bulky equipment of unconventional type.

Although it is possible to ship the polymer in bulk and to convert it to master batch at the injection site, typically using part of the pipeline contents as "free" solvent, in practical terms, the number of separate dissolving machines becomes prohibitive. Users strongly prefer instead to employ a formulated product ready for injection, rather than to be encumbered with dissolving operations.

It has previously been proposed that a more convenient drag reduction product might be made by milling bulk high polymer resin into fine particles, which will dissolve more readily. These, however, tend to reagglomerate on standing, and means of preventing reagglomeration have not been found. Further, in all processes involving mechanical disintegration of bulk resin, whether or not in the presence of a second, non-solvent liquid phase (for example by milling, colloid milling, homogenizing, and the like), there is grave risk of shear degrading the polymer.

It has now been discovered that novel two-phase compositions of liquid media modifying and drag-reducing polymers can be produced, and these overcome all of the above-mentioned problems. Basically, each such composition consists of a disperse phase of fine particles of drag-reducing polymer, suspended in a continuous liquid phase comprising a non-solvent for that particular polymer. As a further requirement, the compositions of both disperse and continuous phase are so selected as to be soluble in the hydrocarbon media (the pipeline stream.)

The new compositions of this invention have the following advantages:

(1) They can contain as much as 50 percent or more of drag-reduction effective polymer at readily pumpable consistencies.

(2) In preferred cases, and according to one aspect of the invention, the polymer can be formed in situ as the final disperse phase, with very significant elimination of processing steps and degradation hazard.

(3) The laborious operation of dissolving high polymer, and the need for using large volumes of solvent are entirely eliminated.

In addition, they appear to be longer acting than prior art compositions. This seems to result from the fact that under pipeline flow conditions, only dissolved polymer suffers shear degradation; suspended particles are immune. The smallest particles dissolve most rapidly, while larger droplets dissolve more gradually during passage along the pipeline. This results in continuous replenishment of the longest, most effective molecules in solution, directly offsetting any loss due to shear degradation. With adequate control of particle size distribution, benefits approximating those of multiple injection sites along the line can be obtained with the economy of a single injection. This controlled rate of solution principle bears a partial analogy to the 12 hour cold capsule, which releases medication slowly.

DESCRIPTION OF THE INVENTION

According to the present invention, there are provided compositions for improving liquid media and for reducing the fluid flow friction loss in the transmission of a hydrocarbon fluid through a pipeline, said compositions comprising:

(i) a continuous phase of a liquid which is normally miscible with said liquid media, e.g., hydrocarbon fluid, and, dispersed therein, (ii) a stable discontinuous phase predominantly comprising fine particles of a high molecular weight polymer which is ultimately miscible with said liquid media, e.g., hydrocarbon fluid.

Another preferred feature of this invention is providing processes for transmitting a hydrocarbon fluid through a pipeline at a reduced fluid flow friction loss, which comprise:

A. intermixing with said fluid a composition comprising:
  (i) a continuous phase of a liquid which is normally miscible with said hydrocarbon fluid, and, dispersed therein,
  (ii) a stable discontinuous phase predominantly comprising fine particles of a high molecular weight polymer which is ultimately miscible with, and normally difficult to solubilize in, said hydrocarbon fluid, the amount of said composition being selected to provide from 10 ppm to 1500 ppm of high molecular weight polymer based on said hydrocarbon fluid; and
B. transmitting the resulting mixture through a pipeline at a velocity sufficient to establish turbulent flow conditions.

According to a preferred aspect, the present invention contemplates a process for producing a liquid media modifying composition comprising:
  (i) dissolving or suspending a monomer capable of forming a high molecular weight polymer, or optionally a mixture of monomers capable of forming a high molecular weight copolymer, in a continuous phase-forming liquid which is normally miscible with said liquid media; and
  (ii) subjecting the monomer or monomers to polymerization conditions so as to produce a stable discontinuous phase predominantly comprising fine particles of high molecular weight polymer ultimately miscible with said liquid media and dispersed in a continuous phase in said continuous phase-forming liquid.

Preferably, the monomer will be a silicone precursor, e.g., octamethylcyclotetrasiloxane; a preferred continuous phaseforming liquid is heavy mineral oil or a methylnaphthalene or mixture thereof having from one to three methyl groups per molecule. In another preferred feature, the monomer will be polymerized in the presence of a transient catalyst, e.g., tetrabutylphosphonium silanolate, at an elevated temperature, e.g., 50°–125° C., preferably 80°±10° C., and then the catalyst will be destroyed by heating at a higher temperature, e.g., 125°–200° C., preferably at about 150°±10° C. Preferred high molecular weight polymers will be polydiorganosiloxanes in which 20 to 100 percent of the organic groups linked to silicon are methyl groups and the remainder are phenyl groups.

In other preferred features, the invention will be used with hydrocarbon fluids comprising crude oil and refined petroleum products, e.g., gasoline, kerosene, distillate fuel oil, jet fuel oil, liquified petroleum gas, pentane, cyclohexane, isooctane, toluene, mixtures thereof, and the like. The preferred high molecular weight resins will be polyhydrocarbons or polydiorganosiloxanes, each having an average molecular weight of at least 500,000, and preferably above 1 million up to about 40 million. If the drag-reducing polymer is a polyhydrocarbon, preferred liquids which are normally miscible with the hydrocarbon fluids are selected from a monohydric alcohol of from 1 to 16 carbon atoms; a dihydric alcohol for from 7 to 16 carbon atoms; an ester of a mono or polyhydric alcohol of from 1 to 16 carbon atoms and an acid of from 6 to 30 carbon atoms; a polyoxyalkylene dialkyl ether; or a hydrocarbon solution of a second polymer of lower molecular weight and composition chemically different from that of the high molecular weight polyhydrocarbon. If the drag-reducing polymer is a polydiorganosiloxane, the preferred liquid which is normally miscible with the hydrocarbon fluids is a liquid hydrocarbon oil of average molecular weight of less than about 2000; optionally, but preferably, these compositions will also include a surface active agent comprising a poly(methylalkyl)siloxane fluid.

Factors affecting the consistency of the present drag-reducing compositions are primarily the viscosity of the continuous phase, and also the volume percent of disperse phase, especially when the latter exceeds about 50 percent. While there are no rigid upper limits, for convenience in handling and pumping it is desirable that the continuous phase have a viscosity not exceeding about 2000 cps. at 25° C.

The range of compositions embraced by this invention is very broad, extending over both silicone and non-silicone polymers. Illustrative embodiments are:
1. A linear hydrocarbon polymer dispersed in one of the following:
  (a) a non-solvent monohydric alcohol of 1 to 16 carbon atoms;
  (b) a non-solvent dihydric alcohol of at least 7 carbon atoms;
  (c) a non-solvent ester, e.g., a mixed fatty acid glyceride such as vegetable oil;
  (d) a non-solvent polyoxyalkylene dialkyl ether, e.g., tetraethylene glycol dimethyl ether; or
  (e) a hydrocarbon solution of a second polymer of lower molecular weight and composition dissimilar to the dispersed polymer; and
2. A polydiorganosiloxane dispersed in a non-solvent hydrocarbon, e.g., white mineral oil or an aromatic process oil.

To promote physical stability of these compositions, which may be termed oil-in-oil emulsions, it is preferred to incorporate a suitable surfactant material selected for non-interference with the method of preparation and with the drag reduction function. The role of the surfactant is to promote a fine state of sub-division of the disperse phase and to retard its rate of coalescence.

Surprisingly, there is almost a complete absence in the prior art of emulsions in which neither phase is aqueous. It was not until 1965 that Molau, Journal of Polymer Science A 3(4), 1267–1278 provided a "verification of the existence of oil-in-oil emulsions".

A very few earlier workers disclosed dispersions of polyhydrocarbons or of vegetable oils in non-aqueous continuous phases including glycerol, formamide or ethylene glycol; but the latter are all water-miscible and hydrocarbon-immiscible, and therefore none of these earlier systems would be suggestive of the present discovery.

As has been mentioned, suspensions of linear polydiorganosiloxanes in selected hydrocarbon oils represent one preferred class of the invention. According to this invention, there can be used an in situ polymerization of an initially homogeneous solution of cyclic siloxane(s) in the hydrocarbon oil. The linear polymers thus produced, upon reaching a relatively low polymer stage, separate from the hydrocarbon phase as microscopic droplets. Polymerization continues within these droplets until high molecular weight is reached.

In a preferred silicone-in-hydrocarbon embodiment, exemplified hereinafter, a transient catalyst, e.g., tetrabutylphosphonium silanolate is used; the polymerization is run at a conventional temperature range, e.g., 80°±5° C. for such catalyst, and after polymerization is complete the catalyst is destroyed by heating to a higher temperature. As is disclosed in the above-mentioned Martellock application, these materials have superior resistance to degradation during use as drag-reduction agent. Alternatively, the catalyst may be an alkali metal silanolate, typically effective at higher temperatures, and the final suspension may be decatalyzed by addition of suitable trace amounts of soluble acid, e.g., an aliphatic carboxylic acid or a naphthenic acid.

Certain poly(methylalkyl)siloxane fluids chain-stopped by trimethylsilyl groups have been found to be effective dispersing agents in the above polydiorganosiloxane-hydrocarbon oil systems, as detailed hereinafter.

As has been mentioned, suspensions of linear polyhydrocarbons in selected liquids as continuous phase media represent another preferred class of the invention. The polyhydrocarbons can be any of the drag-reducing polyhydrocarbons of the prior art, such as polyisobutene, polyisoprene, polybutadiene, ethylene-propylene copolymers, olefin-styrene copolymers, etc., or they may be novel linear polyhydrocarbons such as isoprene-butadiene random copolymers, polyisobutene-polybutadiene block copolymers, etc., provided only that the average molecular weight is at least 500,000 and preferably one million or greater.

In general, the continuous phase media of this class are liquids which are (1) non-solvents for the selected high molecular weight linear polyhydrocarbon, and (2) miscible with liquid hydrocarbons of average molecular weight less than about 2000. A preferred group of media which meet these criteria are aliphatic monohydric alcohols of 1 to 16 carbon atoms, e.g., methanol, hexanol, isooctanol, decanol, hexadecanol, etc. Another preferred group comprises selected esters meeting the above criteria, for example mixed fatty acid glycerides such as cottonseed oil, peanut oil, and soybean oil. Low-cost, inedible grades of these oils are satifactory in the present invention.

In general, as will be understood by those skilled in this art, simple liquid hydrocarbons or refined petroleum oils within the useful viscosity range (<2000 cps), such as those detailed in the polysiloxane examples hereinafter, tend to dissolve linear polyhydrocarbons, and are therefore unsatisfactory as continuous phases because extremely viscous solutions are formed rather than the desired two-phase suspensions. Exceptions may exist where the solubility parameters of polymer and liquid differ by an unusually large amount. However, without recourse to such exceptions, a wide range of low-cost hydrocarbon liquids and oils can nevertheless be used, by taking advantage of the well-known phenomenon of mutual exclusion from solution of dissimilar polymers. Specifically, systems comprising three components, as follows:

(1) linear polyhydrocarbon, >MW 500,000, $\delta = x$
(2) low polymer, MW 50,000, $\delta = y$
(3) oil, MW 900, $\delta = z$ where x and y are substantially dissimilar, and y and z are much closer to each other than they are to x, exist as a stable two-phase system in which there is
 (i) a continuous phase containing all of the low polymer and nearly all of the oil, and
 (ii) a disperse phase containing all of the high polymer and a small part of the oil.

In such a system, the low polymer (2) need not be a polyhydrocarbon. It can be a chemically different low polymer, such as a polyvinyl acetate, a polyoxyalkylene ether or a polysiloxane.

In order to promote and maintain a fine dispersion, a practical suspension of this general model will also preferably contain a surfactant, chosen for preferential compatibility with the oil-low polymer phase in order to favor the latter as the continuous phase (Bancroft's Rule).

In the practice of the method of the present invention, the composition is intermixed with the liquid to be transported, and the liquid is pumped and transferred in conventional manners, as described in the patents above-mentioned. While significant reduction in frictional losses are observed using polymers having a viscosity average molecular weight of as low as 500,000, it is preferred that the high polymers have a molecular weight in the range of from about 1 million to about 40 million and preferably in the range of from about 7 million to about 20 million. The compositions afford effective reductions in drag when the polymer component dissolves in the hydrocarbon fluid to provide a concentration of at least 5 parts per million (ppm), although they are preferably employed in the range of from 10 ppm to 1500 ppm. The optimum amount will vary, depending on the molecular weight of the polymer, the nature of the hydrocarbon fluid and the flow conditions of the fluid. Those skilled in the art are well aware of these effects.

DESCRIPTION OF THE PREFERRED EMBODIMENTS

The following examples are illustrative of the present invention. They are not intended to limit the scope of the invention in any manner whatsoever.

EXAMPLE 1

Thirty-six grams of extra heavy white mineral oil, 27.5 g. of octamethylcyclotetrasiloxane, and 0.5 g. of trimethylsilyl-stopped poly(methylalkyl)siloxane (surfactant, General Electric Co., SF-1100) are heated in an oil bath and stirred under nitrogen at a pot temperature of 133° C. for 1 hour for azeotropic drying, during which 1.2 g. of the (Me$_2$SiO)$_4$ is vaporized from the flask. The bath temperature is then reduced to 95° C. and 10 drops of Bu$_4$P silanolate catalyst is added to the clear mixture. Within 10 minutes haze is seen indicating separation of a polydimethylsiloxane phase. Thereafter, the opacity and the amount of siloxane disperse phase increases rapidly. After 2.1 hours at 94°–95° C., a sample is taken via hypodermic syringe without needle. The intrinsic viscosity in toluene at 25.0° C. is 1.45 dl/g., viscosity average molecular weight 800,000.

After 4 days of aging at room temperature, this suspension is still well dispersed and shows no tendency to agglomerate. Microscopic examination shows that a large proportion of the resin droplets are in the 3–4 micron diameter range.

The composition upon addition to hydrocarbon fluid, in an amount to provide from 10 to 1500 ppm of silicone polymer content, is effective to reduce the frictional drag on the fluid upon transfer through a pipeline.

EXAMPLE 2

Instead of a white mineral oil as in Example 1, an aromatic process oil is used to suspend the polydimethylsiloxane particles. Flexon 391, a commercial product (Exxon Company) sold under the following specifications:

| Density | 0.9745 | |
|---|---|---|
| Viscosity | 866 csk at 100° F. | |
| Composition, %: | Aromatics | 66.5 |
| | Saturates | 30.5 |
| | Polar compounds | 3.0 | is treated to remove catalyst-reactive impurities by passing a hexane-Flexon 391 mixture through a bed of activated alumina and stripping off the hexane under dry nitrogen. A mixture of 19.14 g. of the purified Flexon oil and 18.00 of $(Me_2SiO)_4$ and 0.5 g. of trimethylsilyl-stopped poly(methylalkyl)siloxane surfactant is azeotroped dry (1.93 g. $D_4$ distilled) and polymerized as in Example 1. Five minutes after addition of catalyst (20 drops $Bu_4P$ silanolate) at 90° C. a heavy cloud appears. After 4.4 hours at 80°±10° C. the polymer is a smooth suspension of fine polydimethylsiloxane droplets with a molecular weight of 960,000.

The composition upon addition to hydrocarbon fluid, in an amount to provide from 10 to 1500 ppm of silicone polymer content, is effective to reduce the frictional drag on the fluid upon transfer through a pipeline.

EXAMPLE 3

Instead of a white mineral oil as in Example 1, a methylnaphthalene fraction of petroleum origin is used to suspend the polydimethylsiloxane particles. Methylnaphthalene No. 2, a commercial product of Crowley Hydrocarbon Chemicals, Inc., is treated to remove catalyst-reactive impurities by passing it through a bed of activated alumina. A mixture of 16.20 g. of the purified methylnaphthalene, 10.48 g. of $(Me_2SiO)_4$ and 0.2 g. of trimethylsilyl-stopped poly(methylalkyl)siloxane surfactant is azeotroped dry and polymerized as in Example 1. After 20 hours at 86°±4° C., the polymer is a smooth suspension of fine polydimethylsiloxane droplets with a molecular weight of 6,690,000.

The composition upon addition to hydrocarbon fluid, in an amount to provide from 10 to 1500 ppm of silicone polymer content, is effective to reduce the frictional drag on the fluid upon transfer through a pipeline.

A common method of preparing linear polyhydrocarbons is emulsion polymerization of the corresponding olefins, or mixtures thereof. The result is a latex of polyhydrocarbon dispersed in a water-surfactant medium. These are commercially available in wide variety. While the molecular weights of many commercial latices may be too low for effective drag reduction, in general higher molecular weights, in the drag reduction range, are obtainable by suitable modification of polymerization conditions. A non-aqueous suspension for direct use in pipeline hydrocarbon streams is made by replacing the water phase of a latex with a water-soluble, hydrocarbon-soluble organic liquid, as disclosed above. With due consideration of the nature of surfactant agent(s) already present, and possibly the addition of further suitable surfactant, such replacement can be made without substantial coalescence of the emulsion.

EXAMPLE 4

A styrene-butadiene copolymer latex (General Aniline and Film Co., GAF1400) 60 percent disperse phase, is blended with two volumes of a 1:1 water-tetraethylene glycol dimethyl ether solution with no visible coagulation or other change. The water is then removed by vacuum distillation to give a dispersion of butadiene-styrene copolymer in tetraethylene glycol dimethyl ether, both phases of which are soluble in distillate fuel oil, gasoline, and other liquid hydrocarbons.

The composition upon addition to hydrocarbon fluid, in an amount to provide from 10 to 1500 ppm of resin copolymer content, is effective to reduce the frictional drag on the fluid upon transfer through a pipeline.

The procedure is repeated with water based latices of polyisobutylene, polyisoprene, polybutadiene and polymers and copolymers of ethylene, propylene and alpha olefins of from 4 to 20 carbon atoms. There are obtained drag reducing compositions according to this invention in which the liquid phase is tetraethylene glycol dimethyl ether.

EXAMPLE 5

By conventional methods, e.g., Drukker, U.S. Pat. No. 3,635,863, an emulsion is formed using a vegetable oil (e.g., cottonseed, peanut) plus surfactant as continuous phase, and the preformed polymer-in-water styrene-butadiene copolymer latices of Example 4 as disperse phase. The result is a three-phase, oil-in-water-in-oil emulsion. The water is then removed in vacuo leaving a very fine polymer-in-oil suspension suitable for drag reduction in pipelines.

The procedure is repeated with water-based latices of polyisobutylene, polyisoprene, polybutadiene and polymers and copolymers of ethylene, propylene and alpha olefins of from 4 to 20 carbon atoms. Substantially the same results are obtained.

EXAMPLE 6

Polyisobutylene (m.w. 10,000,000) is dissolved in methylene chloride and mixed with hexadecanol to provide a homogeneous solution. Selective distillation of the methylene chloride leaves a suspension of fine particles of polyisobutylene in hexadecanol which is suitable for use as a drag reducing composition according to this invention. The procedure is repeated, adding a small amount of a surface active agent. A drag reducing composition according to this invention is formed.

EXAMPLE 7

Polyisobutylene (m.w. 10,000,000) is dissolved in kerosene and mixed with a kerosene solution of a polyalkylene oxide (m.w. 10,000-200,000) and a soluble surfactant. The resulting dispersion is concentrated by distillation at reduced pressure and provides an efficiently transportable drag reducing composition according to the present invention.

EXAMPLE 8

An ethylene-propylene copolymer (m.w. 1,000,000) is prepared as a dispersion in pentane by using a catalyst comprising a trialkylaluminum and vanadium chloride with an olefin feed containing 20 to 75 mole % ethylene. This dispersion is suitable for use directly, or with an optional surfactant, as a drag reducing polyhydrocarbon according to this invention.

While the above detailed examples describe useful compositions according to this invention, many obvious variations will suggest themselves to those skilled in this art. The polydimethylsiloxane resins can be replaced in whole or in part with polymethylphenyl or polydiphenylsiloxane unit-containing resins. Suitable surfactants can comprise tall oil, red oil, and commercial anionic and cationic surfactants such as Alamine, Aliquat 21, Priminox 10, Primene JMT, Redicote 2323, all used in the weight percent range of from 0.10 to 3% by weight.

The silicone compositions are uniquely suited to provide improved polishes, cosmetics and the like because they avoid the need to mill or otherwise break up hard chunks of very high molecular weight resins.

All such variations are within the scope of the present invention as defined by the appended claims.

I claim:

1. A process for transmitting a hydrocarbon fluid through a pipeline at a reduced fluid flow friction loss, which comprises:
   A. intermixing with said fluid a composition comprising:
      (i) a continuous phase of a liquid which is different from but normally miscible with said hydrocarbon fluid, said liquid being selected from the group consisting of a monohydric alcohol of from 1 to 16 carbon atoms; a dihydric alcohol of from 7 to 16 carbon atoms, an ester of a mono or polyhydric alcohol of from 1 to 16 carbon atoms and an acid of from 6 to 30 carbon atoms; and a polyoxyalkylene dialkylether; and, dispersed therein,
      (ii) a stable discontinuous phase predominantly comprising fine particles of a high molecular weight polymer which is ultimately miscible with said hydrocarbon fluid, said high molecular weight polymer being a polyhydrocarbon having an average molecular weight of at least 500,000, the amount of said composition being selected to provide from 10 ppm to 1500 ppm of high molecular weight polymer based on said hydrocarbon fluid; and
   B. transmitting the resulting mixture through a pipeline at a velocity sufficient to establish turbulent flow conditions.

2. A process as defined in claim 1 wherein said composition also includes:
   (iii) a surface active agent which is preferentially compatible with continuous phase (i) so as to favor the maintenance of (i) as the continuous phase and (ii) as the discontinuous phase.

3. A process as defined in claim 1 wherein the hydrocarbon fluid is a crude oil or a refined petroleum product.

4. A process as defined in claim 3 wherein said hydrocarbon fluid is a refined petroleum product selected from gasoline, kerosene, distillate fuel oil, jet fuel oil, liquified petroleum gas, pentane, cyclohexane, isooctane, toluene, and mixtures thereof.

5. A process for transmitting a hydrocarbon fluid through a pipeline at a reduced fluid flow friction loss, which comprises:
   A. intermixing with said fluid a composition comprising:
      (i) a continuous phase of a liquid which is different from, but miscible with, said hydrocarbon fluid, said liquid being a hydrocarbon oil of average molecular weight of less than about 2,000, and, dispersed therein,
      (ii) a stable discontinuous phase predominantly comprising fine particles of a polydiorganosiloxane having an average molecular weight of at least 500,000, the amount of composition being selected to provide from 10 ppm to 1500 ppm of said polydiorganosiloxane based on said hydrocarbon fluid; and
   B. transmitting the resulting mixture through a pipeline at a velocity sufficient to establish turbulent flow conditions.

6. A process for transmitting a hydrocarbon fluid through a pipeline at a reduced fluid flow friction loss, which comprises:
   A. intermixing with said fluid a composition comprising:
      (i) a continuous phase of a liquid which is different from, but miscible with said hydrocarbon fluid, said liquid being a hydrocarbon oil of average molecular weight of less than about 2,000; and dispersed therein,
      (ii) a stable discontinuous phase predominantly comprising fine particles of a polydiorganosiloxane having an average molecular weight of at least 500,000, said composition also including
      (iii) a surface active agent which is preferentially compatible with continuous phase (i) so as to favor the maintenance of (i) as the continuous phase and (ii) as the discontinuous phase, the amount of composition being selected to provide from 10 ppm to 1500 ppm of said polydiorganosiloxane based on said hydrocarbon fluid; and
   B. transmitting the resulting mixture through a pipeline at a velocity sufficient to establish turbulent flow conditions.

* * * * *